Patented Apr. 29, 1930

1,756,786

UNITED STATES PATENT OFFICE

VICTOR MORITZ GOLDSCHMIDT, OF OSLO, AND ROLF KNUDSEN, OF BORGESTAD, NEAR SKIEN, NORWAY, ASSIGNORS TO BORGESTAD FABRIKKER, OF BORGESTAD, NEAR SKIEN, NORWAY

CERAMIC MATERIAL AND BINDING AGENT AS WELL AS A PROCESS FOR PRODUCING SUCH MATERIAL

No Drawing. Application filed October 18, 1926, Serial No. 142,519, and in Norway October 24, 1925.

The present invention has for its object improvements in the composition and manufacture of ceramic and refractory materials and binding agents.

It has long been known to use either burnt magnesite or talcum (soapstone powder) in the manfacture of ceramic compositions or as binding agent for the same. We have discovered that substantial advantages over hitherto used processes of this type can be obtained if the talcum (soapstone powder) and magnesite (particularly burnt magnesite) are mixed together in certain definite proportions. We have found that ceramic compositions having particularly valuable properties are obtained, when the proportions of silica (silicium-dioxide) and oxides of bivalent metals (particularly magnesium-oxide) is not substantially less than two molecules of metal oxide to one molecule of silicium dioxide, and when on the other side the excess of free magnesium oxide of the burnt product is not so large, that the product approaches pure magnesite stone in composition.

In accordance with these observations an important feature of the present invention consists in producing a mixture comprising the said proportions of talcum and magnesium oxide and heating the mixture at sufficiently high temperature and for a sufficiently long period of time to result in the formation of magnesium orthosilicate by chemical reaction between talcum and magnesium oxide.

The advantages of not increasing the silica beyond the proportion required to form magnesium orthosilicate consists therein that magnesium orthosilicate has a higher melting point than any mixture of orthosilicate and metasilicate. The advantage of not increasing the proportion of magnesia too high consists therein that the burnt free magnesium oxide is comparatively strongly liable to take up water and carbonic acid, whereby the value of the product is diminished. The object of the process described in the following text is to produce a ceramic product or binding agent of a composition near to $Mg_2SiO_4$ in which the magnesium oxide to a comparatively small proportion can be substituted by ferrous oxide. Hereby is obtained a ceramic product or binding agent which substantially consists of only one type of crystal and moreover a type of crystal which has no transition point between ordinary temperature and the fusion point, so that the creation of any injurious tensions or changes of volume of the product in the course of its use can be avoided. Further the product has the valuable property not possessed by hitherto known ceramic products rich in silicates of being able to take up a considerable proportion of iron oxygen compounds from the melting charges for example slags without undergoing a reduction of its resistance against high temperatures to such a high degree as is the case with Chamotte stone (fire clay stone).

The composition according to the present invention can be used for example in household utensils such as electrical heating plates, crucibles for metallurgical and other technical purposes, refractory bricks, pipes and other articles for electrical and metallurgical uses. Further it can be used as a binding agent or mortar in other ceramic and refractory products, particularly such products which contain magnesium compounds. The material is particularly suitable for use in melting furnaces of various types such as ordinary metallurgical furnaces, coal-, gas-, and oil fired furnaces, electrometallurgical furnaces and other furnaces for electrothermical processes, annealing furnaces, induction-, resistance-, and arc furnaces of any type.

Examples

I 60 kg. of caustic burnt magnesite and 40 kg. of talcum (soapstone powder) are mixed. The mixing takes place either after the materials have been finely divided or the materials are finely ground subsequently to the mixing operation. Water is added to the dry mixture until the degree of plasticity required for moulding purposes is obtained. The water may also be supplied with organic binders for example molasses or tar in order to improve the plasticity. The plastic mass so obtained is cast or fashioned in a suitable manner and burnt to a temperature at which the material obtains the required degree of solidity for technical uses. The burning is preferably effected at a temperature of between 1000 and 1400° for example during 48 hours, so that the talcum and the required proportion of magnesium oxide combine to form magnesium orthosilicate. In certain instances it may also be sufficient to use weaker burning if the product in the course of the later use will become heated to temperatures above 1000°.

II 30 parts by weight of soapstone powder are mixed with 70 parts by weight of magnesite and subjected to the same treatment as according to Example I.

III

A mixture of substances produced as explained in Example I is fashioned and burnt at a temperature of between 1300° and 1450° C. during 48 hours.

Ceramic materials according to the invention can be produced from pure talcum and pure magnesium oxide. Further also from impure talcum (soapstone powder) and ordinary commercial burnt magnesite. It may be of advantage to use caustic burnt magnesite in order to increase plasticity and binding power, but otherwise the character of the method of mixing the materials as well as the bruning may be varied in the individual cases in such manner as will be found suitable in each case.

The product may be used with the composition as above described in a pure condition but silicates and hydrous silicate rich in magnesium may also be incorporated as a filler or as a means to alter the degree of plasticity. Such fillers should preferably not contain more silica in proportion to oxides of bivalent metals than not to effect increase of the silica percentage in the product over that of orthosilicate. It is particularly advantageous to use as an addition natural olivine. This substance may either be introduced in the form of grains of the desired size, so that the binding agent still constitutes one of the main constituents of the total mass, or a product predominately consisting of olivine in the form of suitably sized grains may also be combined with a subordinate proportion of the binding agent about described. The proportions of binding agent and filler or plasticity reducing additions to be employed will depend upon the purposes for which the product is to be used and also upon the relative costs of binding agent and filler as compared with the value of the finished product. Satisfactory results have been obtained by mixtures containing 20–50% by weight of binding agent and 50–80% of additions, but the proportions may be varied also beyond these limits. Up to the present time it has been found to be preferable to use between 35 and 45 parts of binding agent and 65–75 parts of fillers of the character referred to.

It is particularly suitable to adjust the proportions so that the binding agent after completion of the reaction taking place between its constituents at high temperatures will accurately fill the space between the grains of the filler, which grains are presumed to be in direct contact with each other.

It is possible in the described manner to obtain ceramic masses which withstand temperatures considerably higher than 1600°, when raw materials of sufficient degree of purity are used. Talcum or soapstone powder respectively can not be substituted for by other hydrous magnesium silicates, because talcum (soapstone powder) owing to its special mechanical properties will facilitate fashioning and improve the binding power of the raw mass to a considerable degree. As a plasticity reducing means or as a filler instead of natural olivine may also be used burnt masses of talcum and magnesium oxide, which for example can be obtained as a waste material from the manufacture of the ceramic and refractory product described above.

It will be understood from the above that in the production of refractory ceramic objects by burning mixtures of the character above described, it is important that the burning temperature is so chosen that the talcum and magnesium of the mixture react chemically to a considerable degree. It is necessary that a considerable final product or predominant proportion if not the entire material is converted into $Mg_2SiO_4$ during the burning. The temperature and duration of the burning should be adjusted to obtain this result.

Claims.

1. Process of producing a building product including artificially produced magnesium orthosilicate comprising the steps of producing a mixture of substances comprising talcum and magnesium oxide and subjecting the mixture to burning so adjusted as to temperature and duration as to result in the entire quantity of talcum and of magnesium oxide in the mixture entering into chemical reaction with one another so as to form the magnesium orthosilicate $Mg_2SiO_4$.

2. The process of producing a substantially homogeneous magnesium orthosilicate building product, comprising, mixing a natural magnesium orthosilicate with talcum and magnesium oxide, and subjecting the mixture to burning so adjusted as to temperature and duration as to result in the entire quantity of talcum and magnesium oxide entering into chemical reaction with one another so as to form synthetic magnesium orthosilicate.

3. A substantially homogeneous magnesium orthosilicate building product comprising a natural magnesium orthosilicate bonded with a synthetic magnesium orthosilicate.

4. A substantially homogeneous magnesium orthosilicate building product comprising comminuted natural magnesium orthosilicate unitarily bonded with fused synthetic magnesium orthosilicate.

In testimony whereof we have signed our names to this specification.

VICTOR MORITZ GOLDSCHMIDT.
ROLF KNUDSEN.